United States Patent
Zheng (10) Patent No.: US 9,471,958 B2
(45) Date of Patent: Oct. 18, 2016

(54) IMAGE PROCESSING METHOD AND APPARATUS

(71) Applicant: Huawei Technologies Co., Ltd., Shenzhen, Guangdong (CN)

(72) Inventor: Chenglin Zheng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/570,693

(22) Filed: Dec. 15, 2014

(65) Prior Publication Data

US 2015/0170338 A1 Jun. 18, 2015

(30) Foreign Application Priority Data

Dec. 18, 2013 (CN) .......................... 2013 1 0697591

(51) Int. Cl.
*G06T 3/40* (2006.01)
(52) U.S. Cl.
CPC ........... *G06T 3/4076* (2013.01); *G06T 3/4053* (2013.01)
(58) Field of Classification Search
CPC ..... G06T 3/4053; G06T 3/4076; G06T 5/00; G06T 2207/20172; H04N 19/132; H04N 19/182; H04N 19/59
See application file for complete search history.

(56) References Cited

U.S. PATENT DOCUMENTS 9,076,234 B2 * 7/2015 Zheng ................... G06T 3/4053
2007/0229498 A1 * 10/2007 Matusik ................. G06T 17/20
345/420
2007/0237425 A1 10/2007 Taguchi et al.
2009/0074328 A1 3/2009 Matsumoto et al.
2010/0290529 A1 * 11/2010 Topiwala .............. G06T 3/4069
375/240.16

(Continued)

FOREIGN PATENT DOCUMENTS

CN 101388977 A 3/2009
CN 102770887 A 11/2012

(Continued)

OTHER PUBLICATIONS

Chang et al., "Super-Resolution Through Neighbor Embedding," Proceedings of the 2004 IEEE Computer Society Conference on Computer Vision and Pattern Recognition, vol. 1, Washington, DC, Institute of Electrical and Electronics Engineers, New York, New York (Jun. 27-Jul. 2, 2004).

(Continued)

*Primary Examiner* — Jingge Wu
(74) *Attorney, Agent, or Firm* — Leydig, Voit & Mayer, Ltd.

(57) ABSTRACT

Embodiments of the present invention provide an image processing method and apparatus, where the image processing method includes: performing image magnification processing on a low-resolution image to obtain an initial high-resolution image; selecting a central similar block corresponding to a first pixel from the initial high-resolution image; selecting a search block corresponding to the first pixel from the low-resolution image, and determining each similar block in the search block, where the central similar block and the search block have a same block size; and determining a pixel value of the first pixel according to the central similar block and each similar block in the search block. By using technical solutions in the embodiments of the present invention, calculation complexity and an occupied memory resource can be effectively reduced.

12 Claims, 4 Drawing Sheets

(56) References Cited

U.S. PATENT DOCUMENTS

| | | | |
|---|---|---|---|
| 2011/0081094 A1* | 4/2011 | Damkat | G06T 3/4053 382/254 |
| 2011/0222783 A1* | 9/2011 | Matsunobu | G06T 3/403 382/218 |
| 2012/0328210 A1* | 12/2012 | Fattal | G06T 3/403 382/264 |
| 2013/0170767 A1* | 7/2013 | Choudhury | G06T 3/4053 382/260 |
| 2013/0223734 A1* | 8/2013 | Tuzel | G06T 3/4053 382/167 |
| 2014/0093185 A1* | 4/2014 | Liang | G06T 3/4053 382/299 |
| 2014/0133780 A1 | 5/2014 | Liu et al. | |
| 2015/0093045 A1* | 4/2015 | Turkan | G06T 3/4053 382/299 |
| 2015/0154739 A1* | 6/2015 | Choudhury | G06T 5/00 382/266 |

FOREIGN PATENT DOCUMENTS

| | | |
|---|---|---|
| CN | 103020897 A | 4/2013 |
| CN | 103049340 A | 4/2013 |
| CN | 103167218 A | 6/2013 |
| WO | WO 2011092696 A1 | 8/2011 |
| WO | WO 2013131851 A2 | 9/2013 |

OTHER PUBLICATIONS

Guan et al., "Research on Local Self-similarity Descriptors in Images," 2009 Second International Conference on Intelligent Computation Technology and Automation, Institute of Electrical and Electronics Engineers, New York, New York (2009).

Gao et al., "Image Super-Resolution With Sparse Neighbor Embedding," IEEE Transactions on Image Processing, vol. 21, No. 7, pp. 3194-3205, Institute of Electrical and Electronics Engineers, New York, New York (2012).

Freedman et al., "Image and Video Upscaling from Local Self-Examples," ACM Transactions on Graphics, vol. 30, No. 2, Article 12, Association for Computing Machinery, New York, New York (Apr. 2011).

Protter et al., "Generalizing the Nonlocal-Means to Super-Resolution Reconstruction," IEEE Transactions on Image Processing, vol. 18, No. 1, pp. 36-51, Institute of Electrical and Electronics Engineers, New York, New York (Jan. 2009).

Glasner et al., "Super-Resolution from a Single Image," Proceedings of the 12$^{th}$ IEEE International Conference on Computer Vision, pp. 349-356, Institute of Electrical and Electronics Engineers, New York, New York (Sep. 29-Oct. 2, 2009).

* cited by examiner

IMAGE PROCESSING METHOD AND APPARATUS

CROSS-REFERENCE TO RELATED APPLICATION

This application claims priority to Chinese Patent Application No. 201310697591.8, filed on Dec. 18, 2013, which is hereby incorporated by reference in its entirety.

TECHNICAL FIELD

Embodiments of the present invention relate to image processing technologies, and in particular, to an image processing method and apparatus.

BACKGROUND

Nowadays, an increasingly high demand on image information with high quality and high definition occurs in social life. For example, in a home digital media application, 1080p and 4K×2K televisions are increasingly popular. However, most of current television program sources and DVD format videos are standard-definition format videos, and therefore, a super-resolution technology is needed to convert a standard-definition format video into a high-definition or ultra-high definition format video. In addition, in a network video application, due to impact of bandwidth, the quality of many videos on the Internet is poor, and when the videos are displayed on a mobile terminal, a PC, or a Digital TV with a large screen, the super-resolution technology may be used. In addition, image super-resolution is widely applied in fields such as medical imaging and remote sensing satellite.

In the prior art, in the super-resolution technology, a low-resolution image generally needs to be converted into an initial high-resolution image first; and then image processing is performed based on the initial high-resolution image, and the initial high-resolution image is converted into a real high-resolution image. However, because the initial high-resolution image already has higher resolution and more pixels, in a process of performing image processing on the initial high-resolution image, calculation complexity of a system is higher, and more memory sources are occupied during hardware implementation.

SUMMARY

Embodiments of the present invention provide an image processing method and apparatus, so as to reduce calculation complexity and an occupied memory resource.

According to a first aspect, an embodiment of the present invention provides an image processing method, including:

performing image magnification processing on a low-resolution image to obtain an initial high-resolution image;

selecting a central similar block corresponding to a first pixel from the initial high-resolution image;

selecting a search block corresponding to the first pixel from the low-resolution image, and determining each similar block in the search block, where the central similar block and the search block have a same block size; and determining a pixel value of the first pixel according to the central similar block and each similar block in the search block.

In a first possible implementation manner, before the selecting a search block corresponding to the first pixel from the low-resolution image, the method further includes:

performing an image texture analysis on the low-resolution image to obtain an image texture analysis result; and the selecting a search block corresponding to the first pixel from the low-resolution image includes:

selecting, according to the image texture analysis result, the search block corresponding to the first pixel from the low-resolution image.

With reference to the first aspect or the first possible implementation manner of the first aspect, in a second possible implementation manner, the selecting a central similar block corresponding to a first pixel from the initial high-resolution image may include:

selecting an initial central similar block corresponding to the first pixel from the initial high-resolution image, and performing pixel fusion on the initial central similar block to obtain the central similar block.

With reference to the second possible implementation manner of the first aspect, in a third possible implementation manner, the performing pixel fusion on the initial central similar block to obtain the central similar block includes:

performing, by using a pixel reduction processing algorithm, pixel fusion on the initial central similar block to obtain the central similar block.

With reference to the first aspect, or the first, the second, and the third possible implementation manners of the first aspect, in a fourth possible implementation manner, the determining a pixel value of the first pixel according to the central similar block and each similar block in the search block may include:

acquiring a similarity between the central similar block and each similar block in the search block by means of calculation;

determining, according to the acquired similarity, a weight value corresponding to each similar block in the search block;

performing, by using the determined weight value, weighted averaging on a pixel in the low-resolution image to obtain a super-resolution pixel value, where the pixel corresponds to each similar block in the search block; and using the super-resolution pixel value to replace the pixel value of the first pixel in the initial high-resolution image.

With reference to the fourth possible implementation manner of the first aspect, in a fifth possible implementation manner, the acquiring a similarity between the central similar block and each similar block in the search block by means of calculation includes:

calculating a Euclidean distance between the central similar block and each similar block in the search block, where a value of the Euclidean distance is used as a measurement of the similarity.

According to a second aspect, an embodiment of the present invention provides an image processing apparatus, including:

an image magnification processing module, configured to perform image magnification processing on a low-resolution image to obtain an initial high-resolution image;

a first acquiring module, configured to select a central similar block corresponding to a first pixel from the initial high-resolution image;

a second acquiring module, configured to select a search block corresponding to the first pixel from the low-resolution image, and determine each similar block in the search block, where the central similar block and the search block have a same block size; and a pixel value determining module, configured to determine a pixel value of the first pixel according to the central similar block and each similar block in the search block.

In a first possible implementation manner, the image processing apparatus provided in the embodiment of the present invention further includes:

an image texture analyzing module, configured to, before the second acquiring module selects the search block corresponding to the first pixel from the low-resolution image, perform an image texture analysis on the low-resolution image to obtain an image texture analysis result;

where the second acquiring module is specifically configured to select, according to the image texture analysis result, the search block corresponding to the first pixel from the low-resolution image.

With reference to the second aspect or the first possible implementation manner of the second aspect, in a second possible implementation manner, the first acquiring module is specifically configured to select an initial central similar block corresponding to the first pixel from the initial high-resolution image, and perform pixel fusion on the initial central similar block to obtain the central similar block.

With reference to the second possible implementation manner of the second aspect, in a third possible implementation manner, the first acquiring module is specifically configured to perform, by using a pixel reduction processing algorithm, pixel fusion on the initial central similar block to obtain the central similar block.

With reference to the second aspect, or the first, the second, and the third possible implementation manners of the second aspect, in a fourth possible implementation manner, the pixel value determining module includes:

a calculating unit, configured to acquire a similarity between the central similar block and each similar block in the search block by means of calculation;

a weight determining unit, configured to determine, according to the acquired similarity, a weight value corresponding to each similar block in the search block;

a weighted averaging unit, configured to perform, by using the determined weight value, weighted averaging on a pixel in the low-resolution image to obtain a super-resolution pixel value, where the pixel corresponds to each similar block in the search block; and a pixel replacing unit, configured to use the super-resolution pixel value to replace the pixel value of the first pixel in the initial high-resolution image.

With reference to the fourth possible implementation manner of the second aspect, in a fifth possible implementation manner, the calculating unit is specifically configured to calculate a Euclidean distance between the central similar block and each similar block in the search block, where a value of the Euclidean distance is used as a measurement of the similarity.

According to the embodiments of the present invention, when a search block is selected, unlike the prior art in which a search block is selected from an initial high-resolution image, the search block is selected from a low-resolution image, so that pixels of the selected search block are less, calculation complexity is lower, and an occupancy rate of storage resources can also be reduced in a processing process; in addition, a central similar block that has a same pixel as each similar block in the search block may further be selected from an initial high-resolution image, and then a high-resolution pixel value of a currently processed pixel is determined according to the central similar block and each similar block in the search block.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show some embodiments of the present invention, and persons of ordinary skill in the art may still derive other drawings from these accompanying drawings without creative efforts.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are a part rather than all of the embodiments of the present invention. All other embodiments obtained by persons of ordinary skill in the art based on the embodiments of the present invention without creative efforts shall fall within the protection scope of the present invention.

Figure 1:
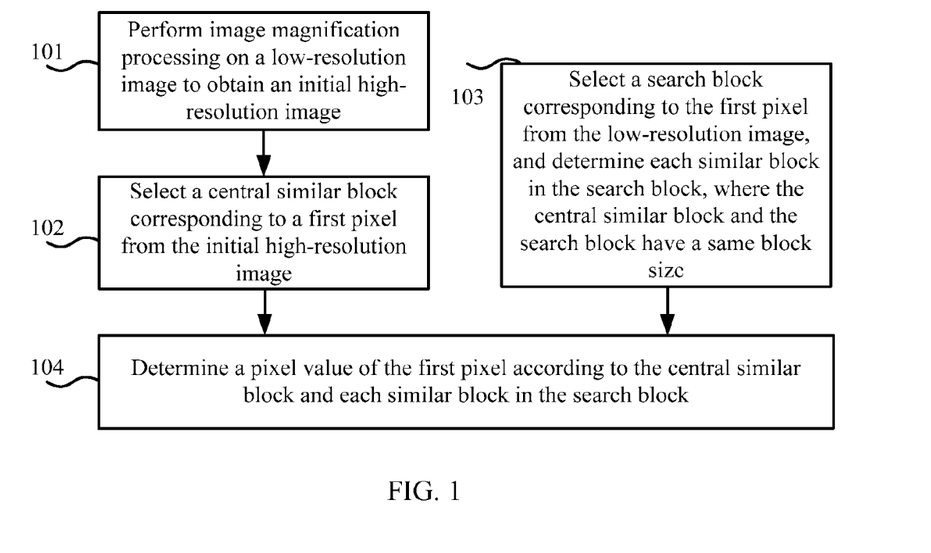
FIG. 1 is a flowchart of a first embodiment of an image processing method according to the present invention.

FIG. 1 is a flowchart of a first embodiment of an image processing method according to the present invention. As shown in FIG. 1, the method in this embodiment may include the following steps:

S101. Perform image magnification processing on a low-resolution image to obtain an initial high-resolution image.

When a low-resolution image is converted into a high-resolution image, an image processing apparatus may acquire a to-be-processed low-resolution image, and perform image magnification processing on the low-resolution image to obtain an initial high-resolution image. The initial high-resolution image is not a finally obtained high-resolution image, but an intermediate process.

During specific implementation, an image magnification processing method, for example, may be an integral multiple interpolation or another image scaling algorithm, magnification processing is performed on the low-resolution image to obtain the initial high-resolution image, and a specific algorithm for the image magnification processing is not limited in this embodiment.

S102. Select a central similar block corresponding to a first pixel from the initial high-resolution image.

S103. Select a search block corresponding to the first pixel from the low-resolution image, and determine each similar block in the search block, where the central similar block and the search block have a same block size.

Specifically, in the prior art, the central similar block and the search block are both selected from the initial high-resolution image. However, a size of the search block determines a calculation amount of a subsequent image processing process. Because there are more similar blocks in the high-resolution image, the search block is bigger, more storage resources are occupied when an image is processed, and calculation complexity also greatly increases.

In view of this, in this embodiment, the central similar block is still selected from the initial high-resolution image, but the search block may be selected from the low-resolution image.

The central similar block corresponding to the first pixel is selected from the initial high-resolution image. Specifically, the central similar block may be selected by using the first pixel as a center.

Because there are less similar blocks in the low-resolution image, a range of the search block is smaller. Therefore, in this embodiment, the search block corresponding to the first pixel is selected from the low-resolution image, and a similar block in the search block is further determined. Specifically, the search block may be selected by using the first pixel as a center, and then each similar block is selected by using each pixel in the search block as a center. The size of the search block may be 15 pixels; a size of the similar block may be 3×3; and the number of similar blocks corresponds to the number of pixels in the search block.

The central similar block and the search block have the same block size. Specifically, in S102, when the central similar block is selected from the initial high-resolution image, a selected size of the central similar block should be the same as a selected size of the similar block in the search block in S103, and both are 3×3.

In addition, an execution sequence of S102 and S103 in this embodiment is not limited thereto. S102 may be first executed, and then S103 is executed; S103 may be first executed, and then S102 is executed; or S102 and S103 may be executed at the same time.

S104. Determine a pixel value of the first pixel according to the central similar block and each similar block in the search block.

During specific implementation, S104 may be specifically implemented by using the following process:

acquiring a similarity between the central similar block and each similar block in the search block by means of calculation;

determining, according to the acquired similarity, a weight value corresponding to each similar block in the search block;

performing, by using the determined weight value, weighted averaging on a pixel in the low-resolution image to obtain a super-resolution pixel value, where the pixel corresponds to each similar block in the search block; and using the super-resolution pixel value to replace the pixel value of the first pixel in the initial high-resolution image.

For all pixels in the initial high-resolution image, corresponding super-resolution values can be obtained by using the foregoing method in S101-S104, and after replacement is performed, a final high-resolution image can be obtained.

According to the image processing method provided in the first embodiment of the present invention, when a search block is selected, unlike the prior art in which a search block is selected from an initial high-resolution image, the search block is selected from a low-resolution image, so that pixels of the selected search block are less, calculation complexity is lower, and an occupancy rate of storage resources can also be reduced in a processing process; in addition, a central similar block that has a same pixel as each similar block in the search block may further be selected from an initial high-resolution image, and then a high-resolution pixel value of a currently processed pixel is determined according to the central similar block and each similar block in the search block.

The technical solution shown in FIG. 1 is described in detail in the following with reference to a specific embodiment.

Figure 2:
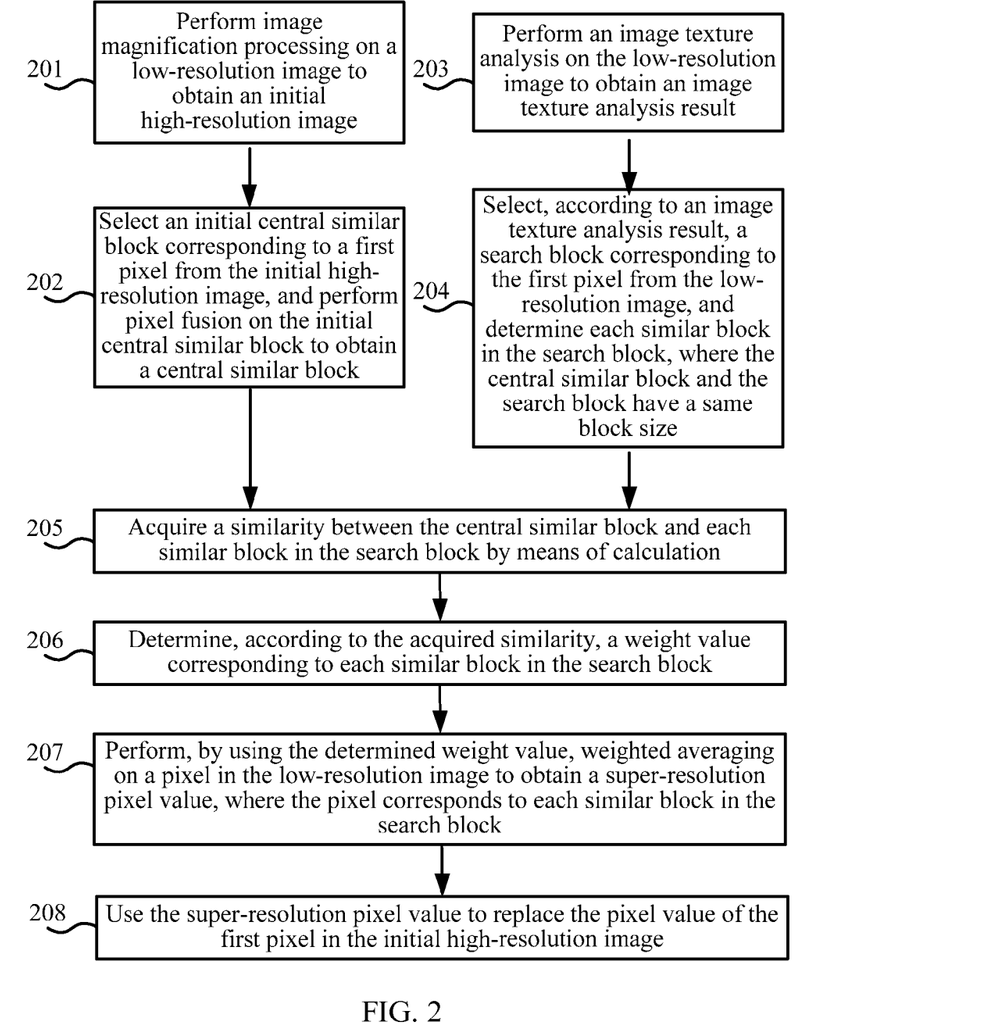
FIG. 2 is a flowchart of a second embodiment of an image processing method according to the present invention.

FIG. 2 is a flowchart of a second embodiment of an image processing method according to the present invention. As shown in FIG. 2, the method in this embodiment may include the following steps:

S201. Perform image magnification processing on a low-resolution image to obtain an initial high-resolution image.

When a low-resolution image is converted into a high-resolution image, an image processing apparatus may acquire a to-be-processed low-resolution image, and perform image magnification processing on the low-resolution image to obtain an initial high-resolution image. The initial high-resolution image is not a finally obtained high-resolution image, but an intermediate process.

During specific implementation, an image magnification processing method, for example, may be an integral multiple interpolation or another image scaling algorithm, magnification processing is performed on the low-resolution image to obtain the initial high-resolution image, and a specific algorithm for the image magnification processing is not limited in this embodiment.

S202. Select an initial central similar block corresponding to a first pixel from the initial high-resolution image, and perform pixel fusion on the initial central similar block to obtain a central similar block.

Specifically, when a size of the central similar block is selected from the initial high-resolution image, if a selected similar block is smaller, for example, when a 3×3 similar block is selected, there are more relatively similar pixels, and an image looks sharper and clearer, but a sawtooth at a hypotenuse is difficult to eliminate; and if a selected similar block is bigger, for example, when a 5×5 similar block is selected, an image becomes blurred, but a saw-tooth phenomenon at an edge is better controlled.

In view of this, for the currently processed first pixel, in this embodiment, the central similar block corresponding to the currently processed first pixel is selected from the initial high-resolution image. Preferably, the initial central similar block corresponding to the first pixel is selected from the initial high-resolution image first, and then pixel fusion is performed on the initial central similar block to obtain the central similar block. During specific implementation, a pixel reduction processing algorithm may be used to perform pixel fusion on the initial central similar block to obtain the central similar block.

Specifically, a bigger initial central similar block, for example, 5×5, may be selected from the initial high-resolution image by using the first pixel as a center; and then the pixel reduction processing algorithm may be used to perform pixel fusion on the initial central similar block to obtain a smaller central similar block, for example, 3×3, and in this way, the saw-tooth phenomenon at the edge of the image can be effectively controlled at the same time when image clarity is ensured.

Figure 3:
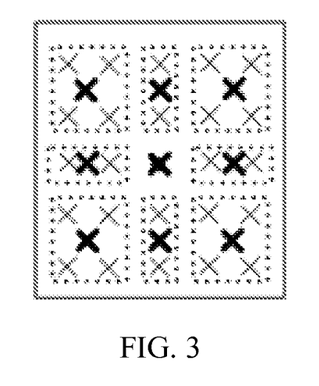
FIG. 3 shows a pixel fusion processing manner in the second method embodiment shown in FIG. 2.

FIG. 3 shows a pixel fusion processing manner in the second method embodiment shown in FIG. 2. As shown in FIG. 3, for example, a process in which fusion is performed on a 5×5 initial central similar block to obtain a 3×3 central similar block is described as follows: First, 5×5 pixels in the initial central block are divided into nine parts, that is, a central point and eight dashed boxes; then, weighted averaging is performed on multiple pixels (separately represented by using a thin x) in each dashed box to obtain one pixel (represented by using a bold x); and finally, the central similar block with 3×3 pixels is obtained.

S203. Perform an image texture analysis on the low-resolution image to obtain an image texture analysis result.

Specifically, in the prior art, a selected search block is a square block using a current pixel as a center, but distribution of similar blocks that have a similarity with the central similar block may tend to be horizontal, or may tend to be vertical. Therefore, if an entire square search block is searched, some pixels that have no similarity are found, which not only increases a calculation amount but also occupies a storage resource.

In view of this, in this embodiment, the image texture analysis is performed before the search block is selected from the low-resolution image.

Specifically, the image texture analysis performed on the low-resolution image is to determine whether a texture of a neighborhood range of the first pixel in the low-resolution image is in an X direction or a Y direction. A specific method is that a variance X_dir in the X direction and a variance Y_dir in the Y direction of pixels (a 3×3 block may be selected by using the first pixel as a center) are calculated first, where the pixels fall within the neighborhood range of the first pixel in the low-resolution image; and then values of the X_dir and the X_dir are compared. If the X_dir is smaller, it indicates that a texture direction is the X direction; and if Y_dir is smaller, it indicates that the texture direction is the Y direction.

S204. Select, according to the image texture analysis result, a search block corresponding to the first pixel from the low-resolution image, and determine each similar block in the search block, where the central similar block and the search block have a same block size.

Specifically, in the prior art, the central similar block and the search block are both selected from the initial high-resolution image. However, a size of the search block determines a calculation amount of a subsequent image processing process. Because there are more similar blocks in the high-resolution image, the search block is bigger, more storage resources are occupied when an image is processed, and calculation complexity also greatly increases.

Therefore, in this embodiment, the search block corresponding to the first pixel is selected from the low-resolution image, and a similar block in the search block is determined, which can not only reduce a calculation amount but also reduce an occupied storage resource. When the search block is selected according to the image texture analysis result, searching for a pixel that has a little effect on the result is reduced, so that the calculation amount and the occupied storage resource are further reduced.

Specifically, according to the image texture analysis result acquired in S203, the search block is selected from the low-resolution image by using the first pixel as a center. Specifically, when a direction of an image texture is an X direction, a search block tends to be selected in the X direction, and specifically a search block whose size is 3×5 may be selected by using the first pixel as a center; and when the direction of the image texture is a Y direction, a search block tends to be selected in the Y direction, and specifically a search block whose size is 5×3 may be selected by using the first pixel as a center. In this way, the searching of the pixel that has a little effect on the result is reduced, so that the calculation amount is reduced.

Further, each similar block in the search block is determined. Specifically, a similar block whose size is 3×3 may be selected by using each pixel in the search block as a center, where the number of similar blocks corresponds to the number of pixels in the search block.

The central similar block and the search block have the same block size. Specifically, in S202, when pixel fusion is performed on the initial central similar block to obtain the central similar block, a selected size of the central similar block needs to be the same as a selected size of the similar block in the search block in S204, and both are 3×3.

S205. Acquire a similarity between the central similar block and each similar block in the search block by means of calculation.

During specific implementation, the similarity may be measured by using a Euclidean distance.

Specifically, an image processing apparatus may calculate a Euclidean distance between the central similar block and each similar block in the search block, where a value of the Euclidean distance is used as a measurement of the similarity. Calculation of the Euclidean distance is shown in the following formula (1):

$$\text{Distance} = \|f(\hat{R}_{k,l}Z_t) - \hat{R}_{i,j}y_t\|_2^2 \quad (1)$$

Distance is a Euclidean distance; $Z_t$ is an initial high-resolution image; $y_t$ is a low-resolution image; $\hat{R}_{k,l}Z_t$ is an initial central similar block that uses a point (k, l) as a center and is in an initial high-resolution image of a current frame; f is a pixel reduction processing algorithm; $f(\hat{R}_{k,l}Z_t)$ is a central similar block after fusion; and $\hat{R}_{i,j}y_t$ is a similar block that uses a point (i, j) as a center and is in an original low-resolution image, that is, a similar block in a search block.

S206. Determine, according to the acquired similarity, a weight value corresponding to each similar block in the search block.

For example, the weight value is generally obtained by using an exponential function, and may be implemented by using the following formula (2):

$$\text{Weight} = \exp\{-\text{Distance}/2\sigma^2\} \quad (2)$$

Weight is a weight value; and σ is a parameter for controlling a weight, where σ is a preset value related to a noise level.

S207. Perform, by using the determined weight value, weighted averaging on a pixel in the low-resolution image to obtain a super-resolution pixel value, where the pixel corresponds to each similar block in the search block.

Calculation of weighted averaging is shown in the following formula (3):

$$\hat{Z}[k, l] = \frac{\sum_{(i,j) \in N^L(k,l)} \text{Weight}[k, l, i, j] y_t[i, j]}{\sum_{(i,j) \in N^L(k,l)} \text{Weight}[k, l, i, j]} \quad (3)$$

$\hat{Z}[k,l]$ is a super-resolution value of a first pixel (k, l); $N^L(k,l)$ is a neighborhood range, corresponding to the first pixel, in a low-resolution image; (i, j) is a pixel in a corresponding neighborhood area in the low-resolution image; and $y_t[i,j]$ is a pixel, corresponding to each similar block in the search block, in the low-resolution image.

S208. Use the super-resolution pixel value to replace the pixel value of the first pixel in the initial high-resolution image.

For all pixels in the initial high-resolution image, corresponding super-resolution values can be obtained by using the foregoing method in S201-S208, and after replacement is performed, a final high-resolution image can be obtained.

According to the image processing method provided in the second embodiment of the present invention, when a search block is selected, unlike the prior art in which a search block is selected from an initial high-resolution image, the search block is selected from a low-resolution image according to an image texture, so that pixels of the selected search block are less, calculation complexity is lower, and an occupancy rate of storage resources can also be reduced in a processing process; in addition, a central similar block that has a same pixel as each similar block in the search block may further be obtained by performing pixel fusion on an initial central similar block selected from the initial high-resolution image, and then a high-resolution pixel value of a currently processed pixel is determined according to the central similar block and each similar block in the search block, which can not only ensure image clarity, but also control a saw-tooth phenomenon well, to make an image edge smooth.

Figure 4:
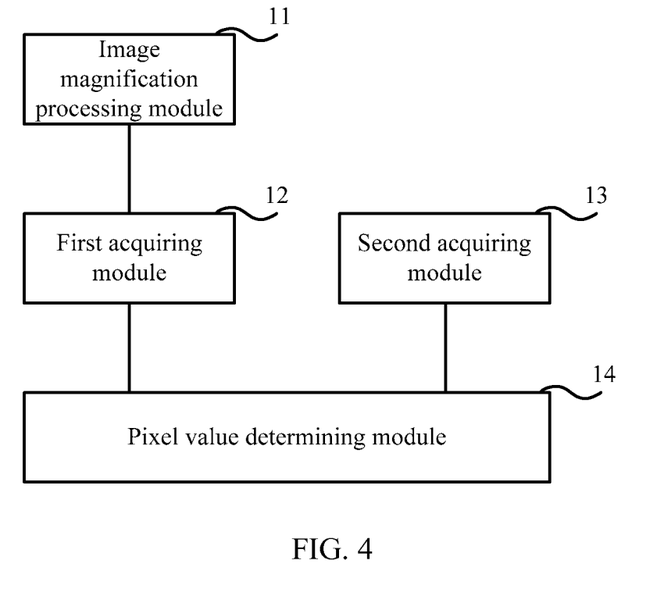
FIG. 4 is a schematic structural diagram of a first embodiment of an image processing apparatus according to the present invention.

FIG. 4 is a schematic structural diagram of a first embodiment of an image processing apparatus according to the present invention. As shown in FIG. 4, the apparatus in this embodiment may include an image magnification processing module 11, a first acquiring module 12, a second acquiring module 13, and a pixel value determining module 14, where:

the image magnification processing module 11 is configured to perform image magnification processing on a low-resolution image to obtain an initial high-resolution image;

the first acquiring module 12 is configured to select a central similar block corresponding to a first pixel from the initial high-resolution image;

the second acquiring module 13 is configured to select a search block corresponding to the first pixel from the low-resolution image, and determine each similar block in the search block, where the central similar block and the search block have a same block size; and the pixel value determining module 14 is configured to determine a pixel value of the first pixel according to the central similar block and each similar block in the search block.

The apparatus in this embodiment may be configured to execute the technical solution in the method embodiment shown in FIG. 1, and implementation principles and technical effects of the apparatus are similar and are not described herein again.

Figure 5:
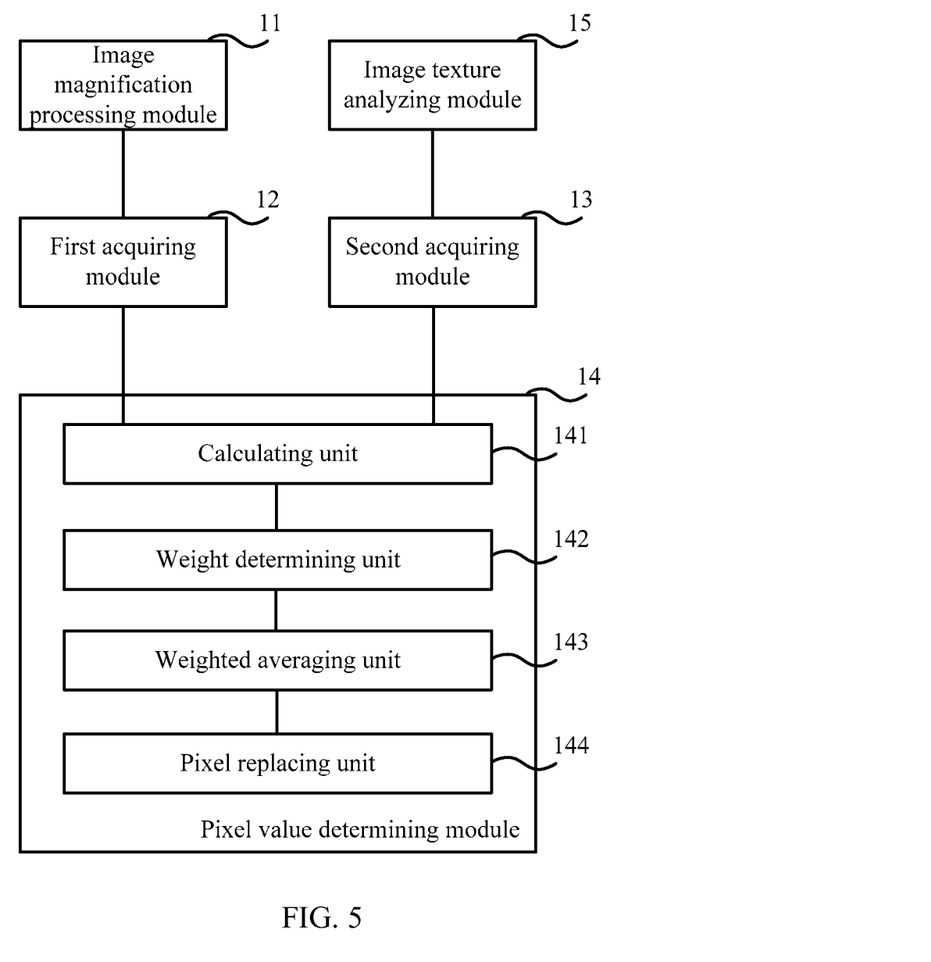
FIG. 5 is a schematic structural diagram of a second embodiment of an image processing apparatus according to the present invention.

FIG. 5 is a schematic structural diagram of a first embodiment of an image processing apparatus according to the present invention. As shown in FIG. 5, on the basis of a structure of the apparatus shown in FIG. 4, the apparatus in this embodiment further includes: an image texture analyzing module 15, configured to, before the second acquiring module selects the search block corresponding to the first pixel from the low-resolution image, perform an image texture analysis on the low-resolution image to obtain an image texture analysis result. Accordingly, the second acquiring module 13 is specifically configured to select, according to the image texture analysis result, the search block corresponding to the first pixel from the low-resolution image.

Further, the first acquiring module 12 is specifically configured to select an initial central similar block corresponding to the first pixel from the initial high-resolution image, and perform pixel fusion on the initial central similar block to obtain the central similar block.

During specific implementation, the first acquiring module 12 is specifically configured to perform, by using a pixel reduction processing algorithm, pixel fusion on the initial central similar block to obtain the central similar block.

Further, the pixel value determining module 14 includes:
a calculating unit 141, configured to acquire a similarity between the central similar block and each similar block in the search block by means of calculation;
a weight determining unit 142, configured to determine, according to the acquired similarity, a weight value corresponding to each similar block in the search block;
a weighted averaging unit 143, configured to perform, by using the determined weight value, weighted averaging on a pixel in the low-resolution image to obtain a super-resolution pixel value, where the pixel corresponds to each similar block in the search block; and
a pixel replacing unit 144, configured to use the super-resolution pixel value to replace the pixel value of the first pixel in the initial high-resolution image.

During specific implementation, the calculating unit 141 is specifically configured to calculate a Euclidean distance between the central similar block and each similar block in the search block, where a value of the Euclidean distance is used as a measurement of the similarity.

The apparatus in this embodiment may be configured to execute the technical solution in the method embodiment shown in FIG. 2, and implementation principles and technical effects of the apparatus are similar and are not described herein again.

Persons of ordinary skill in the art may understand that all or a part of the steps of the foregoing method embodiments may be implemented by a program instructing relevant hardware. The program may be stored in a computer readable storage medium. When the program is executed, the steps of the foregoing method embodiments are executed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but are not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof; however, these modifications or replacements do not make the essence of corresponding technical solutions depart from the scope of the technical solutions in the embodiments of the present invention.

What is claimed is:

1. An image processing method implemented by an image processing apparatus, the method comprising:
obtaining, an initial high-resolution image from a low-resolution image through image magnification processing;
selecting, a central similar block from the initial high-resolution image, wherein the central similar block is associated with a pixel selected from the low-resolution image;
determining a direction of a texture of a neighborhood range of the pixel in the low-resolution image;
upon the determination, selecting, a search block from the low-resolution image associated with the pixel based on the determined direction;
wherein the central similar block and the search block have a same block size; and determining, by the image processing apparatus, a pixel value of the pixel according to the central similar block and the search block.

2. The method according to claim 1, wherein selecting the central similar block from the initial high-resolution image comprises:
selecting, by the image processing apparatus, an initial central similar block from the initial high-resolution image, wherein the initial central similar block is associated with the pixel, and performing pixel fusion on the initial central similar block to obtain the central similar block.

3. The method according to claim 1, wherein the pixel value of the pixel is further determined according to the central similar block and each similar block in the search block.

4. The method according to claim 2, wherein performing the pixel fusion on the initial central similar block to obtain the central similar block comprises:
performing, by using a pixel reduction processing algorithm, the pixel fusion on the initial central similar block to obtain the central similar block.

5. The method according to claim 3, wherein determining the pixel value of the pixel according to the central similar block and each similar block in the search block comprises:
acquiring a similarity between the central similar block and each similar block in the search block;
determining, according to the acquired similarity, a weight value corresponding to each similar block in the search block;
performing, by using the determined weight value, weighted averaging on another pixel in the low-resolution image to obtain a super-resolution pixel value, wherein the another pixel corresponds to each similar block in the search block; and
using the super-resolution pixel value to replace the pixel value of the pixel in the initial high-resolution image.

6. The method according to claim 5, wherein acquiring the similarity between the central similar block and each similar block in the search block comprises:
obtaining a Euclidean distance between the central similar block and each similar block in the search block, wherein a value of the Euclidean distance is used as a measurement of the similarity.

7. An image processing apparatus, comprising:
a processor; and
a memory storing computer program instructions which, when executed by the processor, perform operations comprising:
obtaining an initial high-resolution image from a low-resolution image through image magnification processing;
selecting a central similar block from the initial high resolution image, wherein the central similar block is associated with a pixel selected from the low-resolution image;
determining a direction of a texture of a neighborhood range of the pixel in the low-resolution image;
upon the determination, selecting a search block from the low-resolution image associated with the pixel based on the determined direction, wherein the central similar block and the search block have a same block size; and
determining a pixel value of the pixel according to the central similar block and the search block.

8. The apparatus according to claim 7, wherein the operation of selecting the central similar block from the initial high resolution image further comprises: selecting an initial central similar block from the initial high-resolution image, where in the initial central similar block is associated with the pixel, and performing pixel fusion on the initial central similar block to obtain the central similar block.

9. The apparatus according to claim 7, wherein the pixel value of the pixel is further determined according to the central similar block and each similar block in the search block.

10. The apparatus according to claim 8, wherein the operation of performing the pixel fusion on the initial central similar block to obtain the central similar block further comprises: performing, using a pixel reduction processing algorithm, the pixel fusion on the initial central similar block to obtain the central similar block.

11. The apparatus according to claim 9, wherein the operation of determining the pixel value of the pixel according to the central similar block and each similar block in the search block further comprises:
acquiring a similarity between the central similar block and each similar block in the search block;
determining, according to the acquired similarity, a weight value corresponding to each similar block in the search block;
performing, using the determined weight value, weighted averaging on another pixel in the low-resolution image to obtain a super-resolution pixel value, wherein the another pixel corresponds to each similar block in the search block; and
using the super-resolution pixel value to replace the pixel value of the pixel in the initial high-resolution image.

12. The apparatus according to claim 11, wherein the operation of acquiring the similarity between the central similar block and each similar block in the search block further comprises: obtaining, a Euclidean distance between the central similar block and each similar block in the search block, wherein a value of the Euclidean distance is used as a measurement of the similarity.

* * * * *